United States Patent [19]

Roy et al.

[11] Patent Number: 5,644,120
[45] Date of Patent: Jul. 1, 1997

[54] APPARATUS FOR READING OPTICAL CODE ON MOVING PHOTOGRAPHIC FILM

[75] Inventors: Carl Wilson Roy, Spencerport; John A. Schempp, Jr., Fairport, both of N.Y.

[73] Assignee: Eastman Kodak Company, Rochester, N.Y.

[21] Appl. No.: 610,642

[22] Filed: Mar. 4, 1996

[51] Int. Cl.$^6$ ............................ G06K 7/10; G06K 13/00; G03D 13/08; G03D 13/14
[52] U.S. Cl. ..................... 235/462; 235/475; 396/612; 396/615
[58] Field of Search ...................... 235/462, 473, 235/475; 396/562, 612, 615; 271/240, 253, 254; 360/3

[56] References Cited

U.S. PATENT DOCUMENTS

| | | | |
|---|---|---|---|
| 1,752,966 | 4/1930 | Rusden | 226/17 |
| 1,753,033 | 4/1930 | Taveira | 226/17 |
| 2,281,627 | 5/1942 | Smith | 226/18 |
| 3,139,963 | 7/1964 | Nadler et al. | 226/19 |
| 3,752,377 | 8/1973 | Knapp | 226/17 |
| 4,049,486 | 9/1977 | Henley | 226/17 |
| 4,736,228 | 4/1988 | Ito | 355/75 |
| 4,761,675 | 8/1988 | Sawasaki | 355/76 |
| 4,891,513 | 1/1990 | Okita et al. | 250/239 |
| 4,909,425 | 3/1990 | Susini et al. | 226/17 |
| 4,994,850 | 2/1991 | Imamura et al. | 355/75 |
| 5,055,874 | 10/1991 | Kralles et al. | 355/76 |
| 5,134,430 | 7/1992 | Koizumi | 354/320 |
| 5,167,751 | 12/1992 | Shimizu et al. | 226/19 |
| 5,258,807 | 11/1993 | Reinke | 355/76 |
| 5,271,542 | 12/1993 | Yamamoto | 226/179 |
| 5,285,325 | 2/1994 | Kiesow | 360/3 |
| 5,317,139 | 5/1994 | Evans et al. | 235/462 |
| 5,406,352 | 4/1995 | Kralles et al. | 355/75 |
| 5,475,465 | 12/1995 | Narukami | 396/615 |
| 5,523,820 | 6/1996 | Mooney et al. | 355/76 |
| 5,535,062 | 7/1996 | Blackman | 360/3 |

FOREIGN PATENT DOCUMENTS

| | | | |
|---|---|---|---|
| 0884192 | 8/1943 | France | 226/19 |
| 3729982 | 3/1989 | Germany | 226/19 |

*Primary Examiner*—Donald T. Hajec
*Assistant Examiner*—Douglas Rodriguez
*Attorney, Agent, or Firm*—Charles E. Snee, III

[57] ABSTRACT

An apparatus for reading optical code on a moving web of photographic film includes a first frame (84); a pair of parallel tracks (132, 134) supported by the fast frame; a pair of carriage members (138, 140) mounted for movement along the tracks; a pair of oppositely facing edge guides (148, 156, 158) each supported by one of the carriage members, each edge guide including a serpentine contact surface (160) with a central portion (162) for engaging an edge surface of a moving web; and a mechanism (106–120) for moving the carriage members back and forth along the tracks; and a pair of flexures (122, 124) for resiliently engaging the mechanism for moving with the carriage members, to resiliently load the edges of the web. The apparatus further includes a second frame (70, 186, 248); a pair of film deflectors (262, 264) supported by the second frame; and a mechanism (74–96, 180–238) for relatively positioning the two frames with the film deflectors at least partially engaging the film with the serpentine contact surface, the mechanism being selectively adjustable to vary the deflection of the web toward the serpentine path, so that webs of different types of photographic film can be constrained. One or both of the carriage members may support an apparatus (274, 276) for reading optical code on an edge of a web of photographic film. The reader includes a housing (284) having a slot (286) through which an edge of the web may be transported; a light source (290) mounted on one side of the slot; a code reader (294) mounted on the other side of the slot; a frame (138, 140) for supporting the housing; and a mechanism (302–310) for moving the housing relative to the frame to adjust a location of the code reader relative to an edge of a web.

14 Claims, 14 Drawing Sheets

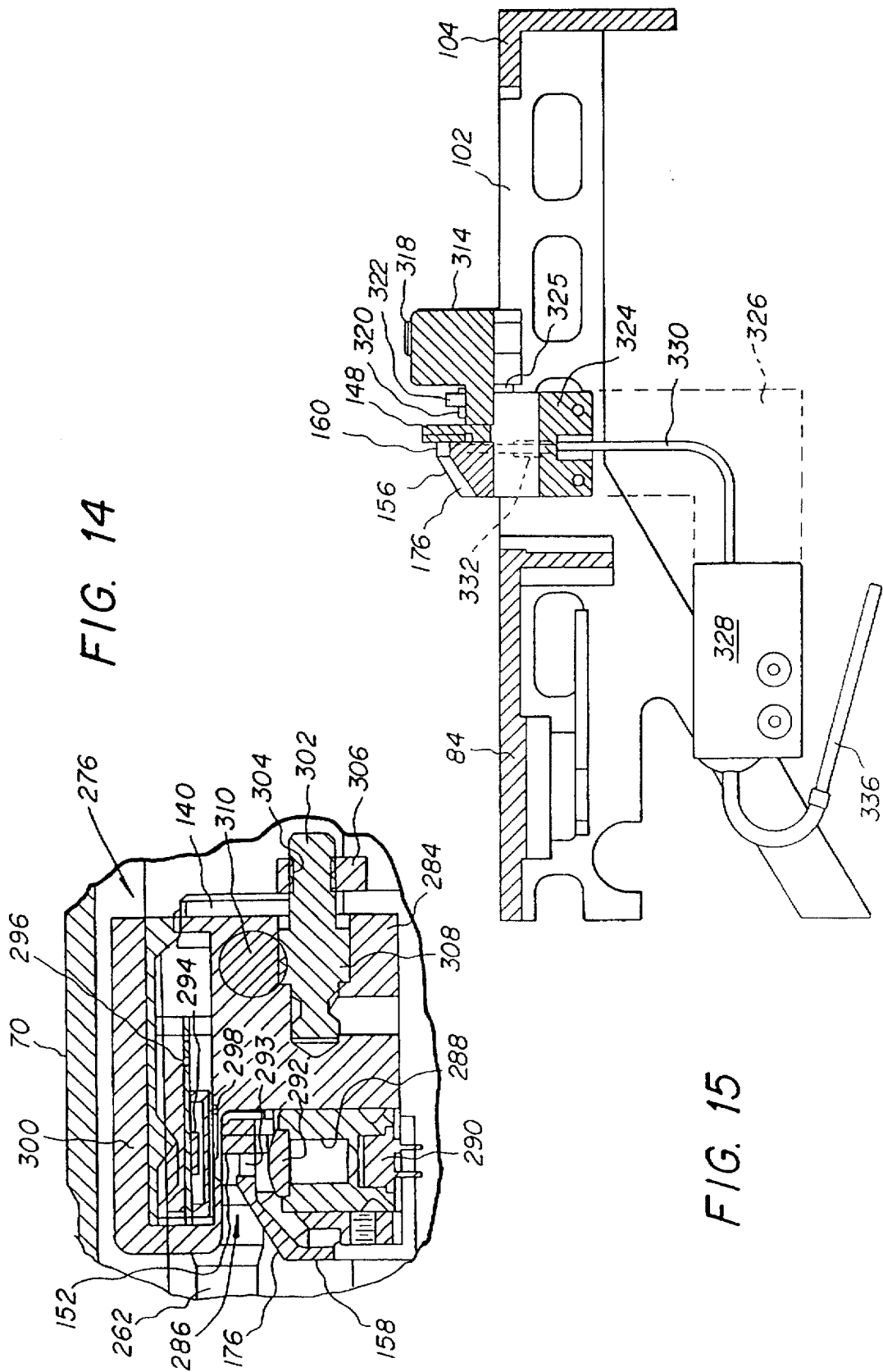

APPARATUS FOR READING OPTICAL CODE ON MOVING PHOTOGRAPHIC FILM

TECHNICAL FIELD

The invention is related in general to apparatus for reading optical codes on moving photographic films. More particularly, the invention concerns such apparatus which includes features for precisely adjusting to accommodate films having different combinations of thickness, stiffness and width.

BACKGROUND OF THE INVENTION

In high volume photographic printers, features are known for flattening a processed film strip to facilitate printing. For example, commonly assigned U.S. Pat. No. 5,055,874 discloses a film flattening apparatus of the type shown in FIG. 1 of this description. Such known apparatus 10 is particularly suitable for use in photofinishing apparatus in which the film enters and leaves along paths disposed in essentially the same plane as an exposure aperture. One such photofinishing apparatus is a high speed printer currently available from Eastman Kodak Company under the designation KODAK CLAS 35 II Color Printer.

Apparatus 10 is useful with processed or developed photographic film 12 comprising a thin web 14 with edges 16, 18; frames 20; perforations 22; and spaced edge notches 24. The notches are detected to indicate the position of the web relative to an exposure aperture, in the familiar manner, and may be on either side of the web depending on the type of processor used. Apparatus 10 includes a base 26 having an essentially flat surface 28 for contacting film 12 as it moves through the apparatus. An exposure aperture may be provided through surface 28. Adjoining flat surface 28 are a pair of cylindrical portions 30, 32 having curved film contacting surfaces 34, 36. The curvature of surfaces 34, 36 is chosen so that a film wrapped onto the surfaces will acquire sufficient lateral column strength to facilitate flattening against surface 28 as the film moves past. Film code readers have been positioned adjacent similar curved surfaces.

Opposite surfaces 34, 36 are positioned a pair of film deflector members 38, 40 having curved surfaces 42, 44 for engaging the edge portions of the film. Each of the deflector members is in the form of an elongated bar. To prevent scratching of the image portions of frames 20, members 38, 40 include reliefs 46, 48. Spaced upstream and downstream from surfaces 34, 36, outboard of deflector members 38, 40 along the path of movement of the film, are a further pair of cylindrical elements 50, 52 which bound valleys into which deflector members 38, 40 can move. Thus, when the deflector members are moved into the illustrated position, the film is deflected along a serpentine path extending over element 50, under deflector member 38, over surface 34, over surface 28, over surface 36, under deflector member 40, and over element 52. Due to the lateral column strength imparted by wrapping the film around the several curved surfaces as described in U.S. Pat. No. 5,055,874, the film flattens well against surface 28 to facilitate printing.

Although the apparatus shown in FIG. 1 has achieved a considerable measure of success, some problems have been encountered. Photographic film is sold in a considerable variety of formats which may differ in properties such as film thickness, stiffness and width. The apparatus of FIG. 1 is configured to handle films having a fixed width, meaning that several such apparatus must be available to enable a photofinisher to process films of various widths. Thus, a need has existed for such an apparatus which can readily adjust to accommodate films of various transverse widths.

The apparatus of FIG. 1 also is configured to accommodate only rather small variations in film thickness and stiffness, which influence considerably the degree of wrap onto surfaces 34, 36 and the depth of engagement of deflector members 38, 40, necessary to ensure good flatness of the film against surface 28. Thus a further need has existed for such an apparatus which can readily be adjusted to accommodate films of various widths.

Commonly assigned U.S. Pat. No. 5,317,139 discloses an optical code reader for photographic film which can read bar codes present on the edges of the film just outside the perforations. A need has existed for a reader head embodying such a reader and including features for accurately adjusting the position of the reader head relative to the edge of a passing strip of film.

U.S. Pat. No. 5,055,874 also discloses a type of notch detector which can be adjusted in lateral position to align with notches 24. However, the range of adjustment is suited only for films having a fixed width. Thus, a need has existed for such an apparatus which can readily adjust to accommodate films of various transverse widths.

SUMMARY OF THE INVENTION

The primary objective of the invention is to provide an improved apparatus for reading optical code on a moving strip of photographic film, the apparatus being adjustable for films having different combinations of width, thickness and stiffness.

Another objective of the invention is to provide such an apparatus having an optical code reader which is adjustable to align precisely with an optical code on an edge of the film.

A further objective of the invention is to provide such an apparatus having an edge notch detector which is similarly adjustable.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The apparatus of the invention is particularly suited for reading optical code on moving web of photographic film. As such, the apparatus may include a first frame; a substantially straight track supported by the first frame; first and second carriage members mounted for movement along the track; first and second oppositely facing edge guides each supported by a respective one of the carriage members, each edge guide being positioned transversely to the track and each edge guide comprising a contact surface for engaging an edge of the web moving between the edge guides, each contact surface comprising a central portion and, on opposite sides of the central portion, further curved portions to provide lateral strength in the film moving across the contact surfaces between the edge guides. Means are included for moving the first and second carriage members back and forth along the track to vary a distance between the edge guides to accommodate webs of different widths; a first flexure resiliently engages the means for moving with the first carriage member when the guides are moved toward each other;, and a second flexure resiliently engages the means for moving with the second carriage member when said guides are moved toward each other.

The apparatus further may include a second frame; first and second film deflectors supported by the second frame;

means for relatively positioning the fast and second frames with the film deflectors engaging the film on opposite sides of the central portion, thereby to deflect the film into a serpentine path extended along one of the further curved potions, across the central portion and along the other of the further curved portions, the means for relatively positioning being selectively adjustable to vary deflection of the film into the serpentine path, whereby films having different properties can be constrained on the edge guides.

The apparatus may further include first and second housings each having a slot through which an edge of the web may be transported, the housings being supported respectively by the first and second carriage members; a light source mounted in each housing on one side of each slot; a code reader mounted in each housing on an opposite side of each slot; and means for moving each housing relative to its respective carriage member to adjust a location of each reader relative to an edge of the web. The housing also may be mounted on only one of the carriage members.

The means for moving the carriage members may include a first lead screw rotatably supported by the first frame; a second, oppositely threaded lead screw rotatably supported by the first frame; a first traveling nut on the first lead screw; a second traveling nut on the second lead screw; the fast flexure resiliently engaging the fast nut with the first carriage member when the guides are moved toward each other; the second flexure resiliently engaging the second nut with the second carriage member when the guides are moved toward each other; and means for rotating the lead screws. Rather than a pair of lead screws, oppositely threaded screws may be provided on a single shaft.

The apparatus also may include means for detecting movement of the edge guides to positions corresponding to a preselected width of the web and producing a signal; and control means responsive to the signal for causing the means for moving the carriage members to move the guides beyond the positions to compress the first and second flexures to load the edge guides resiliently against the edges of the web. Each edge guide may include a transverse contact surface for engaging a strip of film and an angled surface for guiding a strip to the contact surface during movement of the edge guides toward one another.

The means for relatively positioning may include a third frame; a first, substantially straight guide supported by the third frame, the first frame being mounted for movement on the first guide; a second, substantially straight guide supported by the third frame, the second frame being mounted for movement on the second guide; a cam rotatably supported by the third frame; first and second elevator levers pivotably supported by the third frame and engaged with the cam, the elevator levers being pivotably connected respectively with the first and second frames; and means for rotating the cam to pivot the elevator levers and thereby to move the first and second frames along the first and second guides. The cam may be a plate having cam slots on opposite sides, the fast and second elevator levers being engaged with opposite cam slots. The plate may be a gear driven by the means for rotating the cam. The apparatus may include a plurality of sensors for detecting rotation of the cam to positions corresponding to webs with different properties. The first and second film deflectors each may include a roller having raised edges for engaging the film.

The means for moving the housing may include a shaft mounted for rotation in the housing, the shaft having an end in threaded engagement with the carriage member; a pinion fixedly mounted on the shaft; and a worm gear mounted for rotation in the housing and engaged with the pinion, whereby rotation of the worm gear causes the pinion to rotate the shaft and the end to move the housing relative to the carriage member. The light source may include a light emitting diode and a plano-convex lens. The code reader may include a glass window coated with an infrared filter material.

The invention provides certain advantages. The apparatus can handle films of different widths and, due to the resilient loading of the edge guides against the film, is insensitive to variations in the width of the film. The resilient loading can be readily adjusted for different films. The apparatus will not over-constrain the film path since it will track with the film rather than track the film. For thicker films, the depth of engagement or deflection of the film can be controlled to be less than that required for thinner films, to provide the desired lateral column strength. For stiffer films, the depth of engagement can be caused to decrease. The depth of engagement also can be used to control tension in the moving film. For a film of given thickness and stiffness, an increase in transverse width of the film can be accommodated with a deeper engagement. Thus, the apparatus can handle films of various formats. Each reader head can be accurately adjusted to ensure its alignment with fixed reference in an associated edge guide, thus greatly simplifying the set up of the apparatus. Accuracy is improved by mounting the light source and reader in a single housing, thus permitting a single positional adjustment for alignment.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 14 shows an enlarged sectional view of the film code reader head shown in FIG. 7.

FIG. 15 shows a sectional view of the notch detector along line 15—15 of FIG. 4.

DESCRIPTION OF THE PREFERRED EMBODIMENTS

Figure 1:
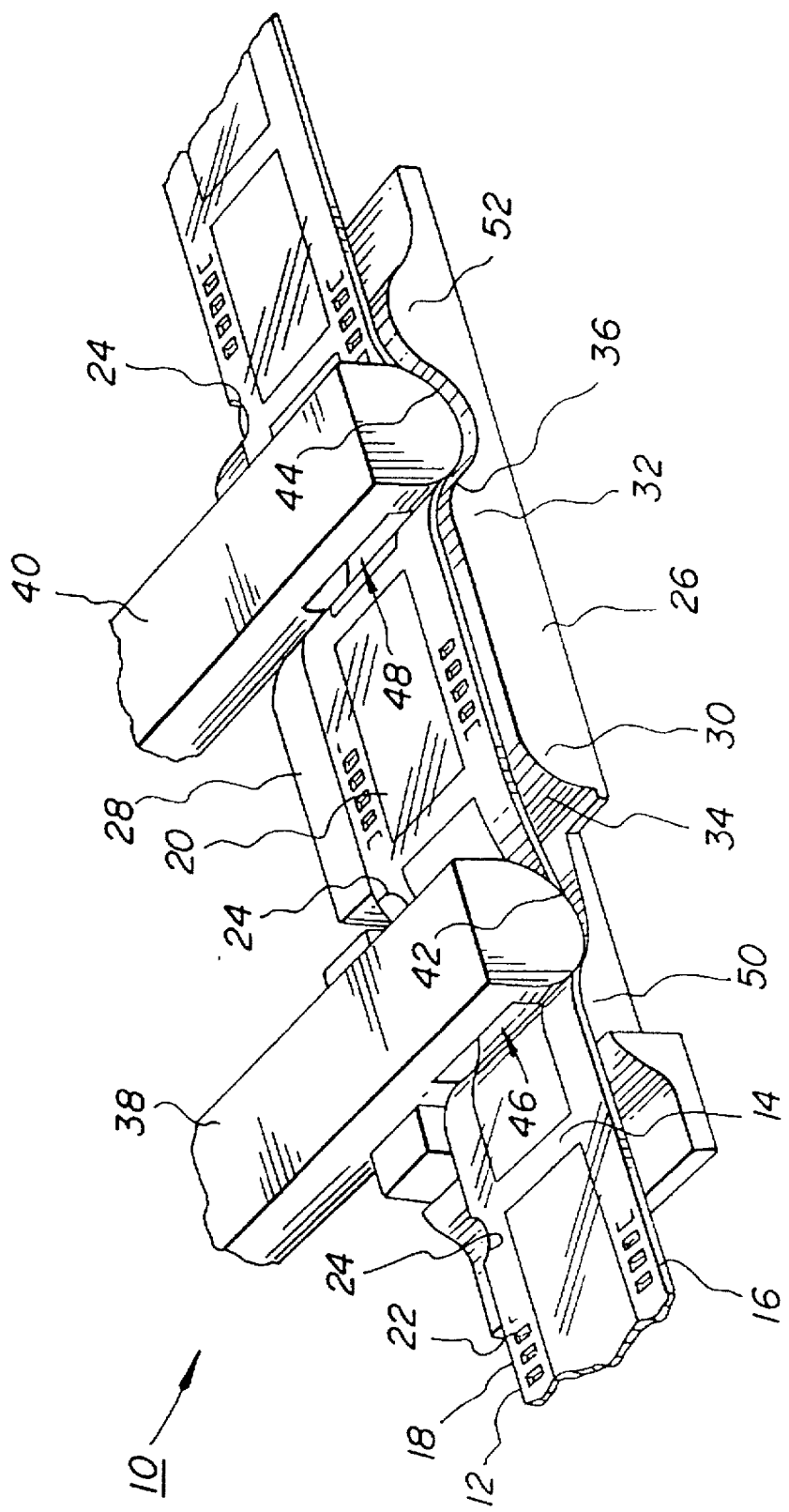
FIG. 1 shows a perspective view of a prior art apparatus for flattening photographic film.
Figure 2:
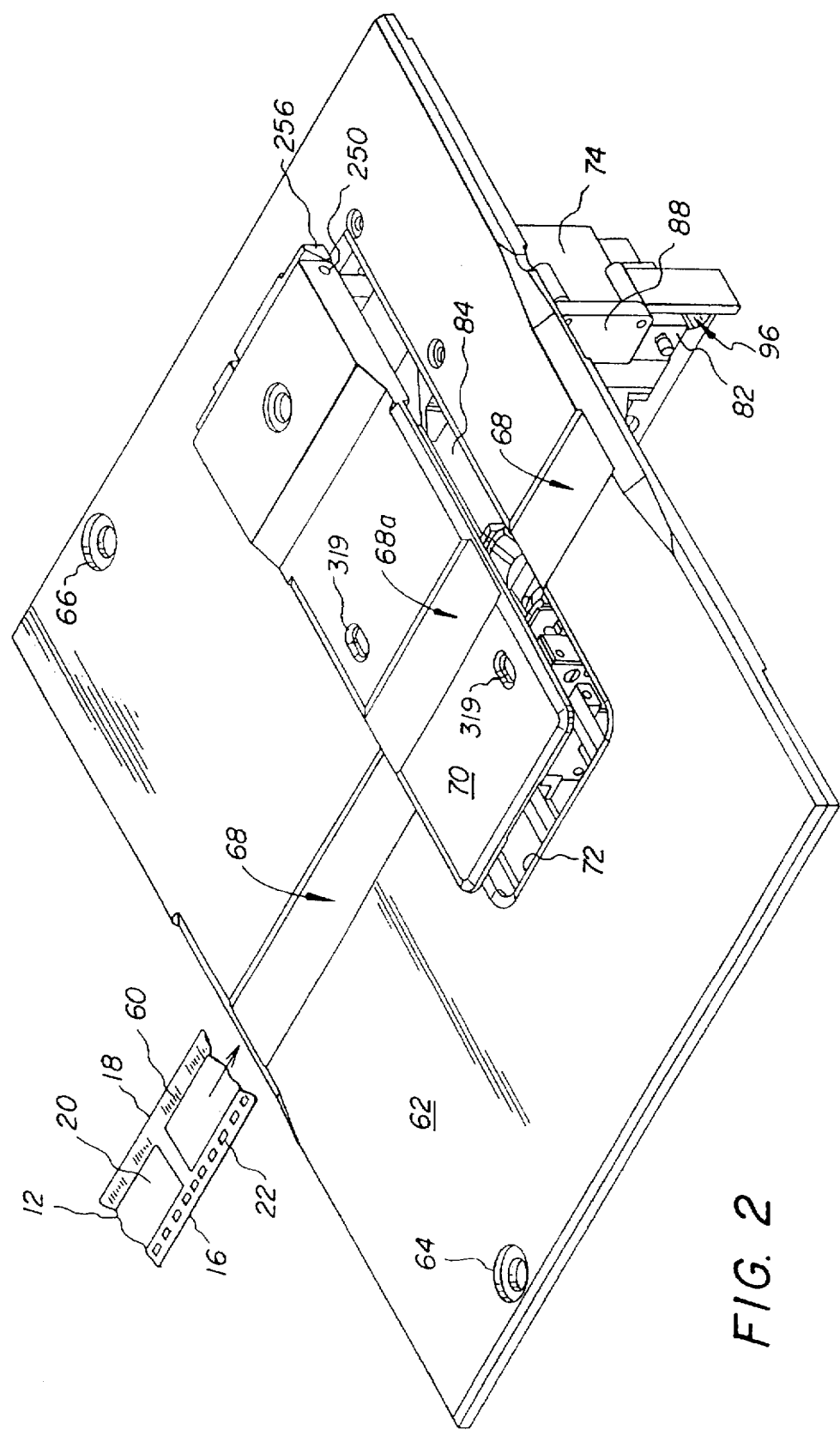
FIG. 2 shows a perspective view of an apparatus for reading optical codes on photographic film, in accordance with the invention.
Figure 3:
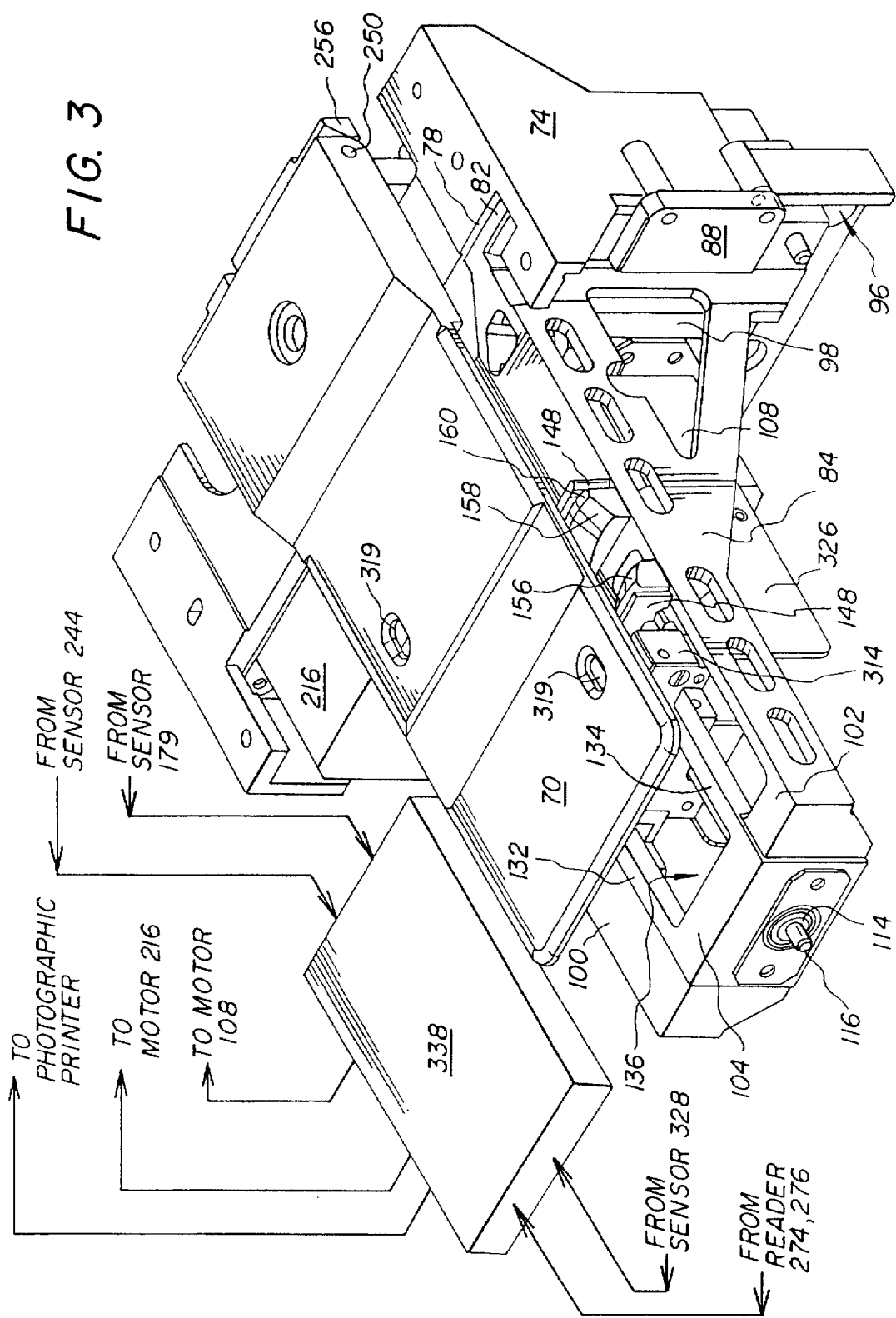
FIG. 3 shows the apparatus of FIG. 2 with the mechanism support plate removed and a controller shown schematically.

The following is a detailed description of the preferred embodiments of the invention, reference being made to the drawings in which the same reference numerals identify the same elements of structure in each of the several Figures.

Referring to FIGS. 2 to 9, various features of the apparatus of the invention can be understood. Film strip 12 includes a film code 60 along one or both edges, such as a bar code identifying the product type and frame number, as described in U.S. Pat. No. 5,317,139. Such a film strip is fed across a support or deck plate 62 having apertures 64, 66 for mounting the plate to an associated apparatus, such as a photographic printer. A shallow image relief slot 68 is provided across the deck plate to avoid scratching images in frames 20. A film deflector support plate 70 is positioned just above an opening 72 through the deck plate. For some applications, support plate 70 may be lowered to close opening 72 and bypass the film code reader of the invention. So, an image relief slot 68a is provided across the support plate, to align with slot 68. A frame 74 is mounted to an under side of deck plate 62.

Figure 4:
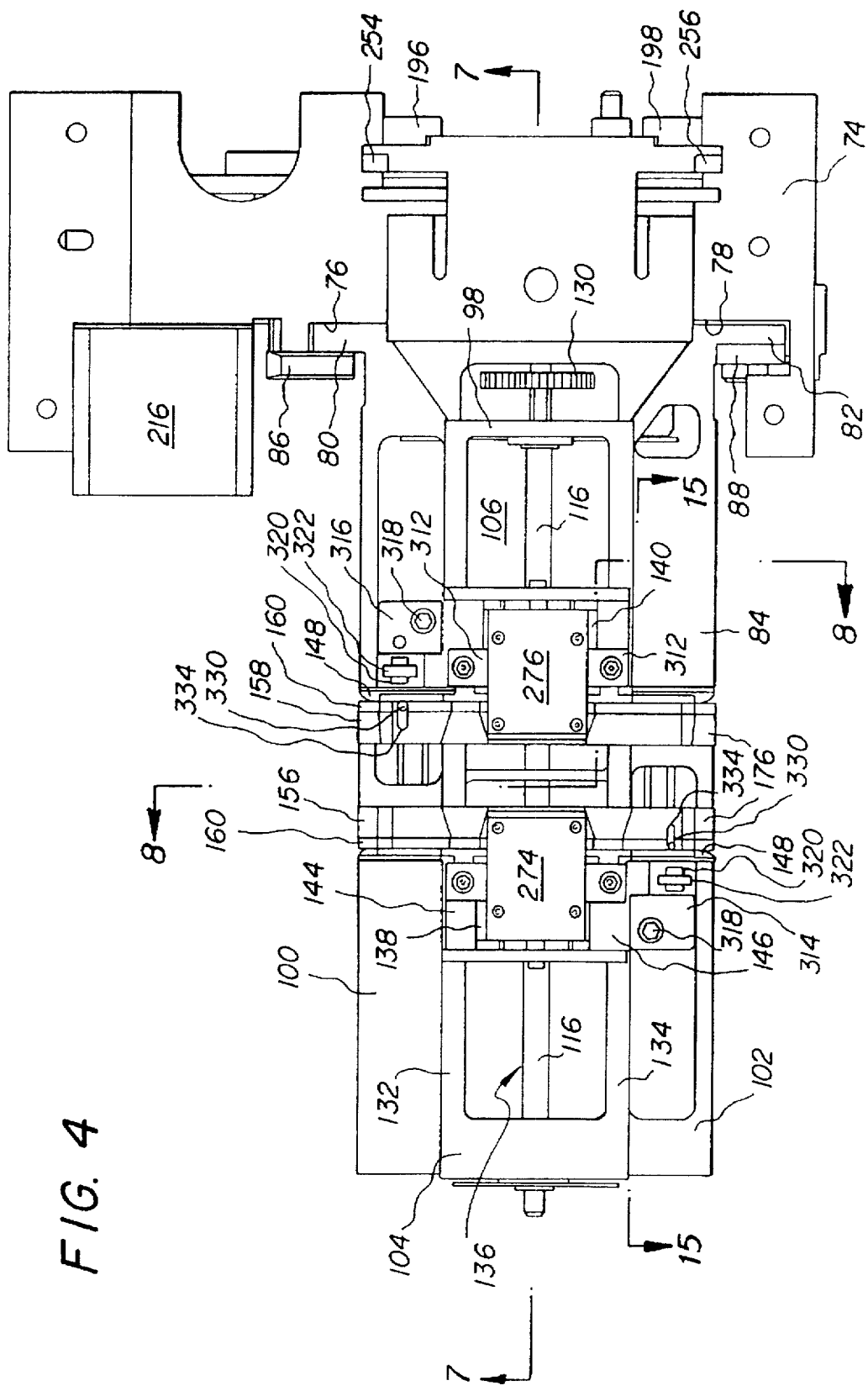
FIG. 4 shows a top plan view of the apparatus of FIG. 3 with the deflection roller support plate removed.
Figure 5:
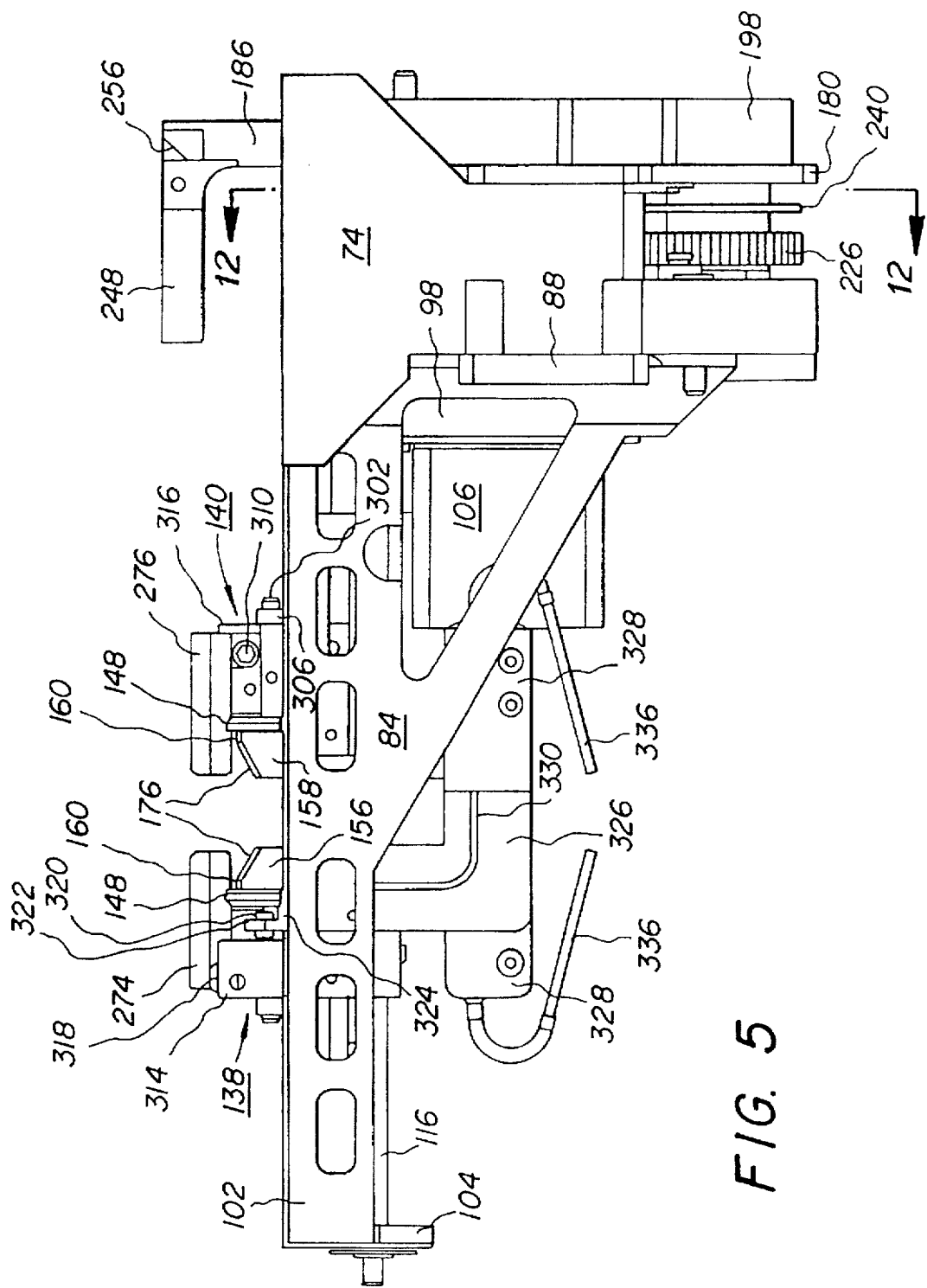
FIG. 5 shows a side elevation view of the apparatus of FIG. 4.
Figure 6:
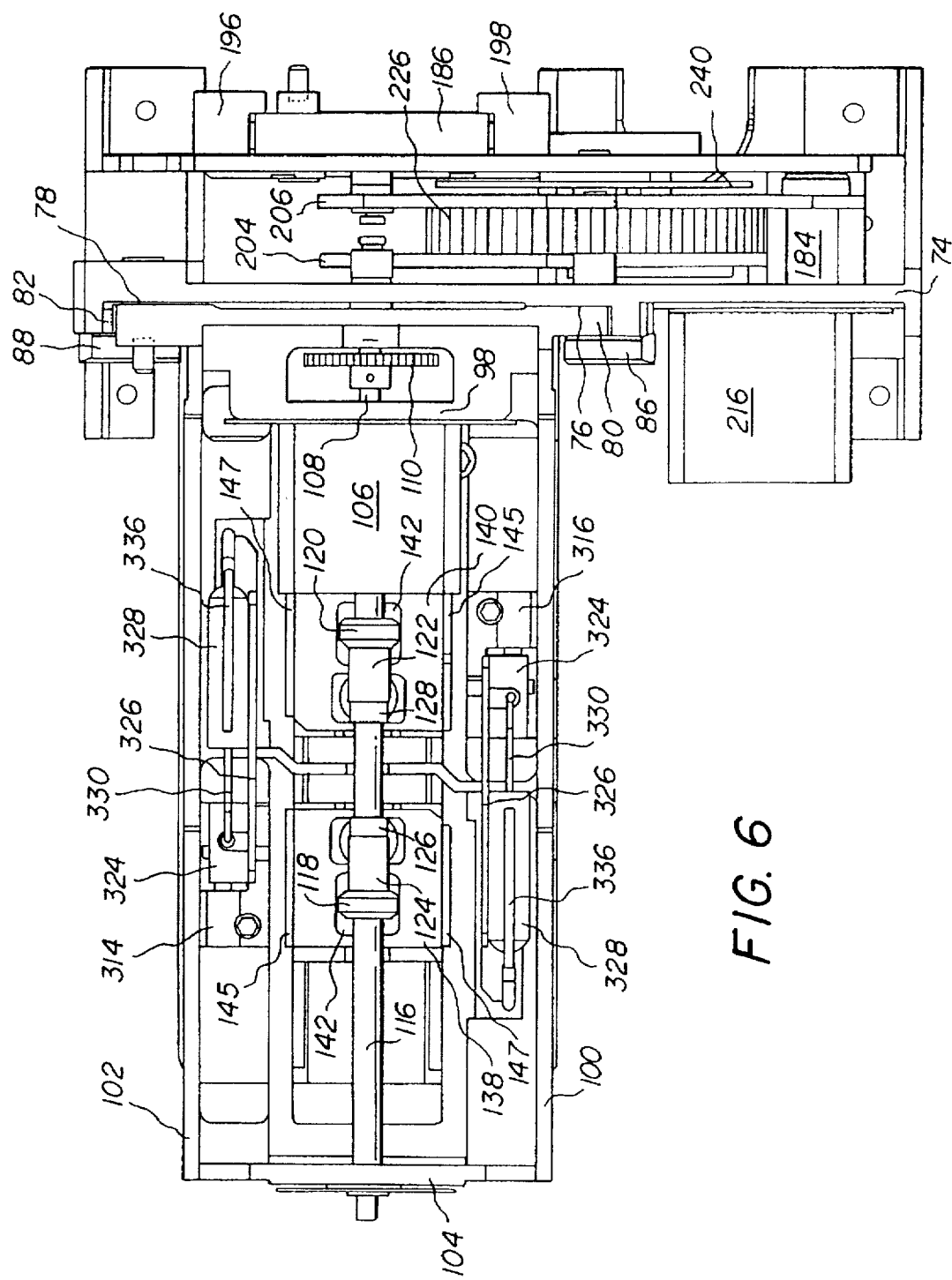
FIG. 6 shows a bottom plan view of the apparatus of FIG. 5.
Figure 9:
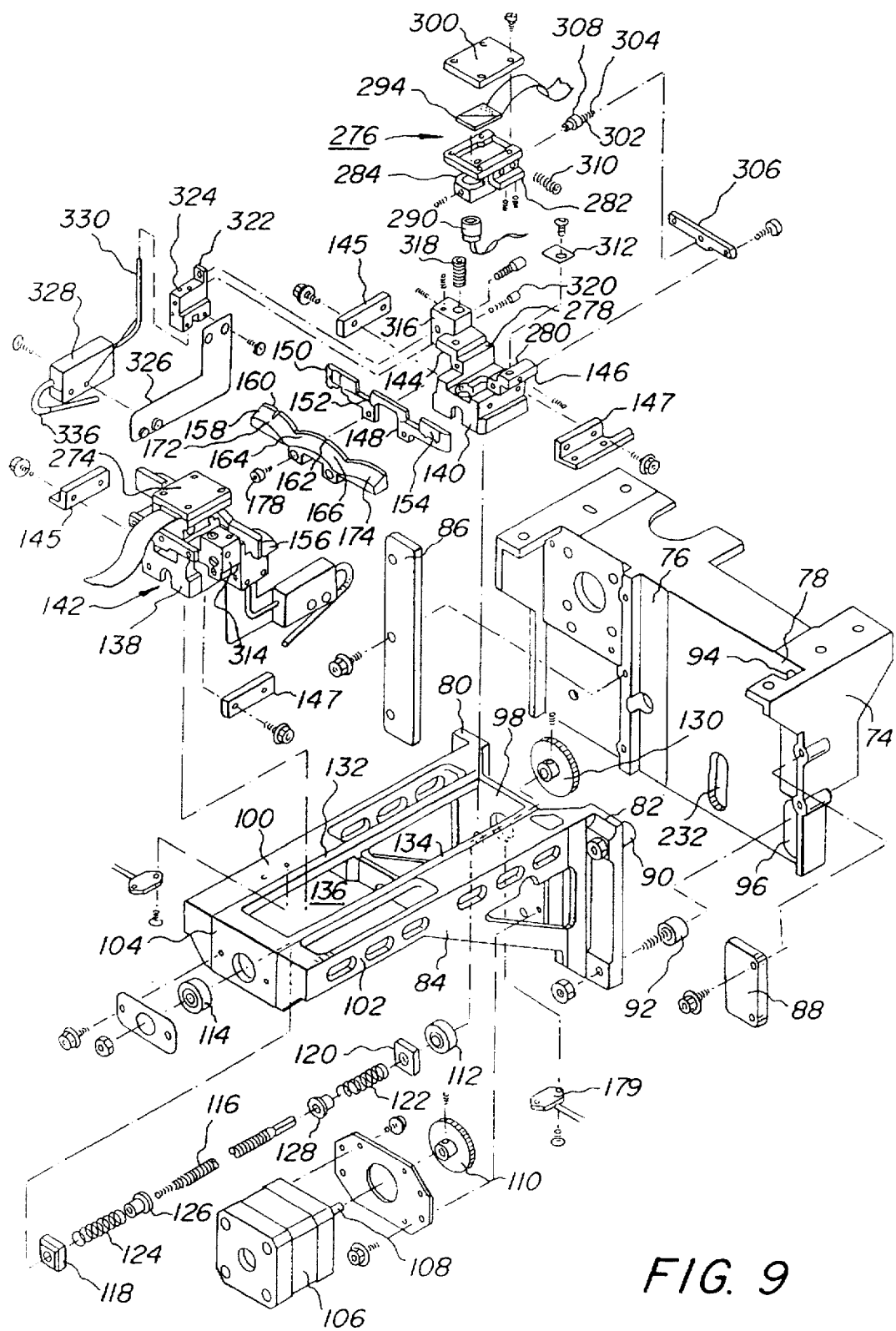
FIG. 9 shows an exploded view of the horizontal positioning mechanism for the edge guides, the film code reader heads and the notch detector heads.

As seen best in FIGS. 4, 6 and 9, frame 74 includes a pair of vertically extended slide surfaces 76, 78 which engage a pair of flanges 80, 82 on a cantilevered carriage frame 84. A pair of keeper plates 86, 88 hold the flanges against the slide surfaces. A pair of guide rollers 90, 92 are mounted to flange 82 and extend into a pair of vertically extended slots 94, 96 formed through slide surface 78. Thus, carriage frame 84 can move vertically relative to frame 74. A mechanism for moving the carriage frame will be described subsequently.

Figure 7:
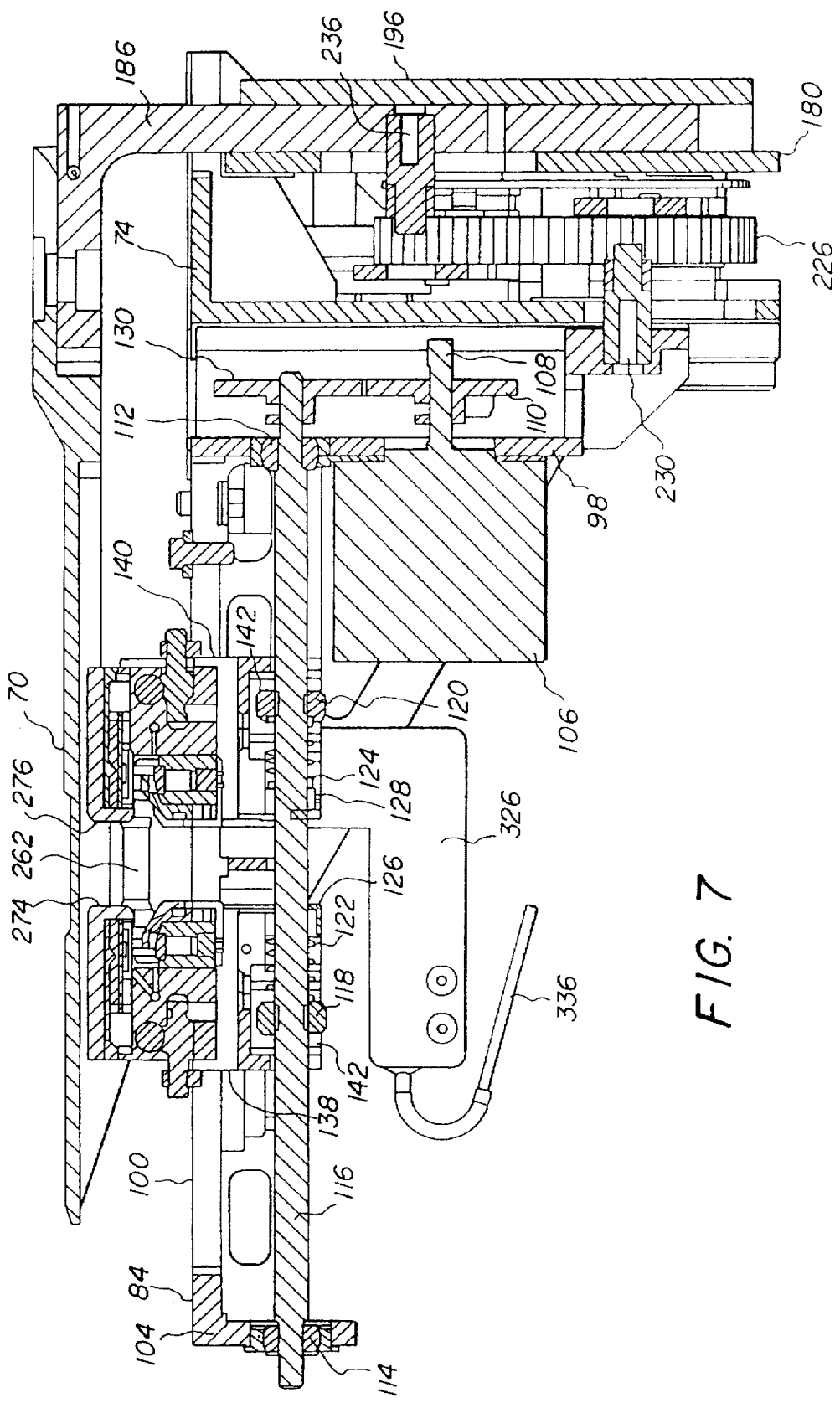
FIG. 7 shows a sectional view along line 7—7 of FIG. 4.

Frame 84 includes an essentially vertical back wall 98 from which extend a pair of parallel cantilever arms 100, 102 whose outer ends are joined by a front wall 104. A motor 106 is mounted to back wall 98, with an output shaft 108 of the motor extended through the back wall. A driver gear 110 is mounted for rotation with shaft 108. As best seen in FIGS. 6, 7 and 9, a pair of bearings 112, 114 are supported by walls 98, 104, respectively, and rotatably support a lead screw 116. As viewed in FIGS. 6 and 7, lead screw 116 includes on one half a right hand threaded portion and on the other half a left hand threaded portion. Those skilled in the art will appreciate that a pair of oppositely threaded, coaxial lead screws also could be used rather than a single, integral lead screw. Mounted on one threaded portion is a traveling nut 118; and on the other threaded portion, a traveling nut 120. Thus, when the lead screw is rotated, the two traveling nuts will move toward or away from each other. A pair of flexures such as coil springs 122, 124 are mounted around the lead screw between the traveling nuts, along with sliding collars 126, 128. A driven gear 130 is mounted to an end of the lead screw near back wall 98, in position to mesh with driver gear 110. Thus, rotation of motor 106 will drive the traveling nuts back and forth on the lead sew.

Cantilever arms 100, 102 are provided on their upper surfaces with a pair of parallel guide tracks 132, 134 separated by an open center slot 136. Within slot 136, a pair of carriage members 138, 140 are mounted, each carriage member having on its under side a pocket or holder 142 for one of nuts 118, 120, one of springs 122, 124 and one of collars 126, 128. As best seen in FIG. 9, each carriage block includes a pair of laterally extended flanges 144, 146 whose under surfaces engage tracks 132, 134, respectively. Below the tracks, a pair of keeper plates 145, 147 are attached to the sides of the carriage members to limit vertical movement, as seen in FIGS. 6 and 9. Thus, movement of traveling nuts 118, 120 causes the carriage members to slide toward or away from each other on tracks 132, 134.

Figure 8:
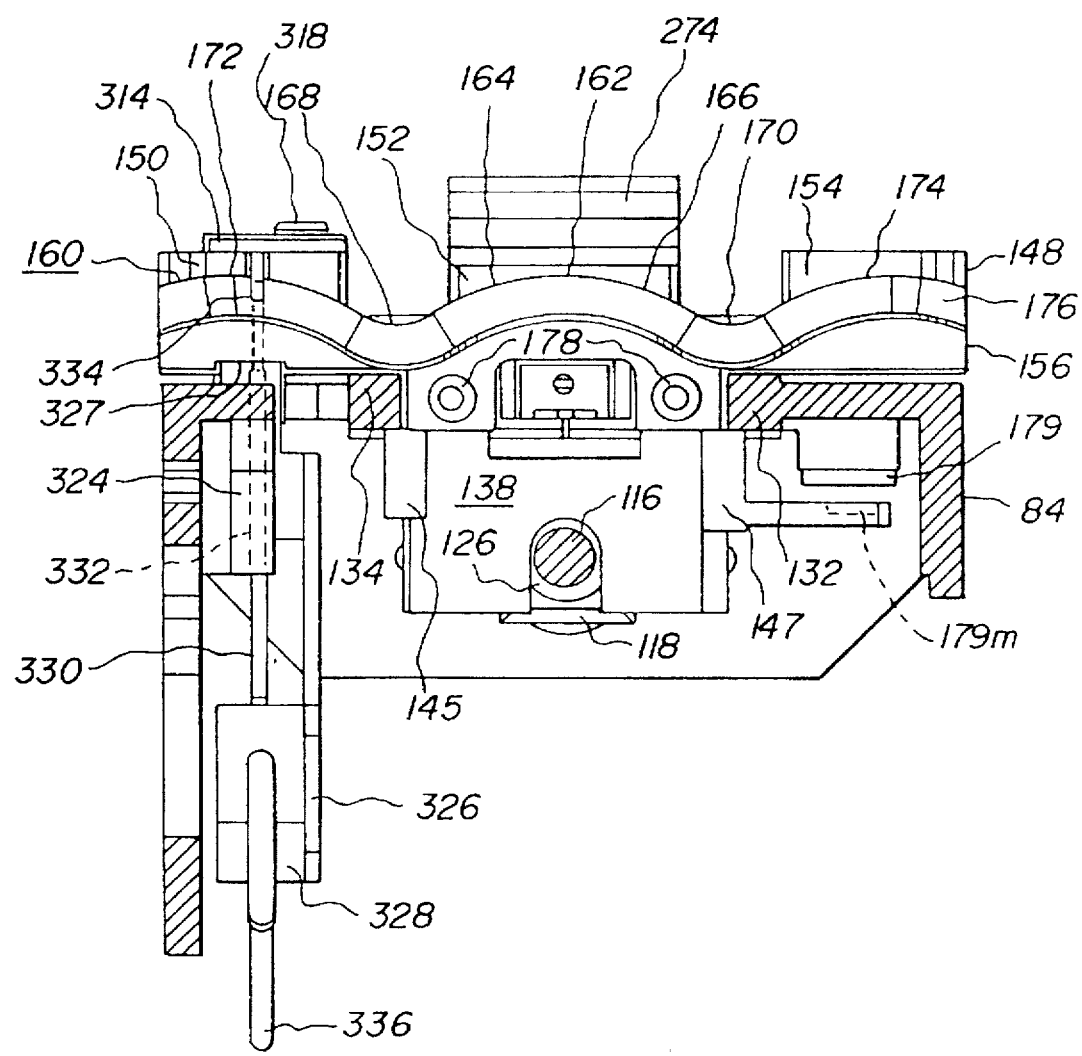
FIG. 8 shows a sectional view along line 8—8 of FIG. 4, with edge guide 158 and associated parts omitted.

Attached to the front vertical surface of each carriage block is a vertical edge guide member 148 having spaced vertical wall segments 150, 152, 154 for engaging the very edges of a film strip. A pair of identical horizontal edge guide members 156, 158 are mounted with one in front of each vertical edge guide member. As best seen in FIGS. 8 and 9, each guide member 156, 158 includes an undulating, horizontal contact surface 160 having a general serpentine configuration much like that described in U.S. Pat. No. 5,055,874. Contact surface 160 engages an under surface of a film strip immediately adjacent one of edges 16, 18. As shown in FIG. 8, contact surface 160 includes a centrally positioned curved portion 162 flanked by further, downwardly curved portions 164, 166, all shaped to provide lateral strength to a film strip wrapped onto them, in the manner previously described. Although central portion 162 preferably is curved, it alternatively may be essentially flat without departing from the scope of the invention. Adjacent to curved portions 164, 166 are a pair of valley portions 168, 170 into each of which a film deflecting roller is lowered, in a manner to be described subsequently. Outboard of the valley portions, a pair of upwardly curved portions 172, 174 are provided. An undulating, upwardly sloped wall portion 176 is provided to guide a film strip upward to engagement with contact surface 160 and wall segments 150, 152, 154. A pair of fasteners 178 secure guide members 148 and guide members 156, 158 to their respective carriage members.

In operation of the adjustable edge guides thus far described, a film strip is threaded between guides 156, 158, which initially are separated by a distance greater than the transverse width of the film. Motor 106 is then operated to rotate lead screw 116 and cause traveling nuts 118, 120 to move toward each other. As the nuts move, they tend to compress springs 122, 124 which press on collars 126, 128 to transmit force to carriage members 138, 140. Movement of the carriage members proceeds until a position is reached corresponding to a separation between guide members 148 approximately equal to the transverse width of the film. As the edge guides move into engagement with the film, the film rides up sloping surface 176 onto undulating support surface 160, where the edges of the film contact vertical guide members 148. The corresponding position of the carriage members is detected by one or more sensors 179, visible in FIGS. 8 and 9, mounted on an under surface of cantilever arm 100 or 102 or both. Sensor 179 may be a conventional proximity type of sensor which responds to presence of magnets 179m carried by a transverse flange on keepers 145, 147. Sensor 179 can detect a plurality of spaced positions of the carriage member corresponding to different widths of film. Separate sensors for each film width may be used, plus a further sensor for a reference position when the edge guides are separated to a maximum extent. A signal from sensor 179 is sent to the controller for the apparatus, to be described subsequently, which stops motor 106 after a predetermined mount of additional rotation. The additional rotation compresses springs 122, 124 to provide a precise, resilient load against edges 16, 18. As a result, the apparatus can handle films of different widths and, due to the resilient loading of the edge guides against the film, is insensitive to variations in the width of the film. The edge guides will not over-constrain the film path since they will track with the film rather than track the film.

Figure 10:
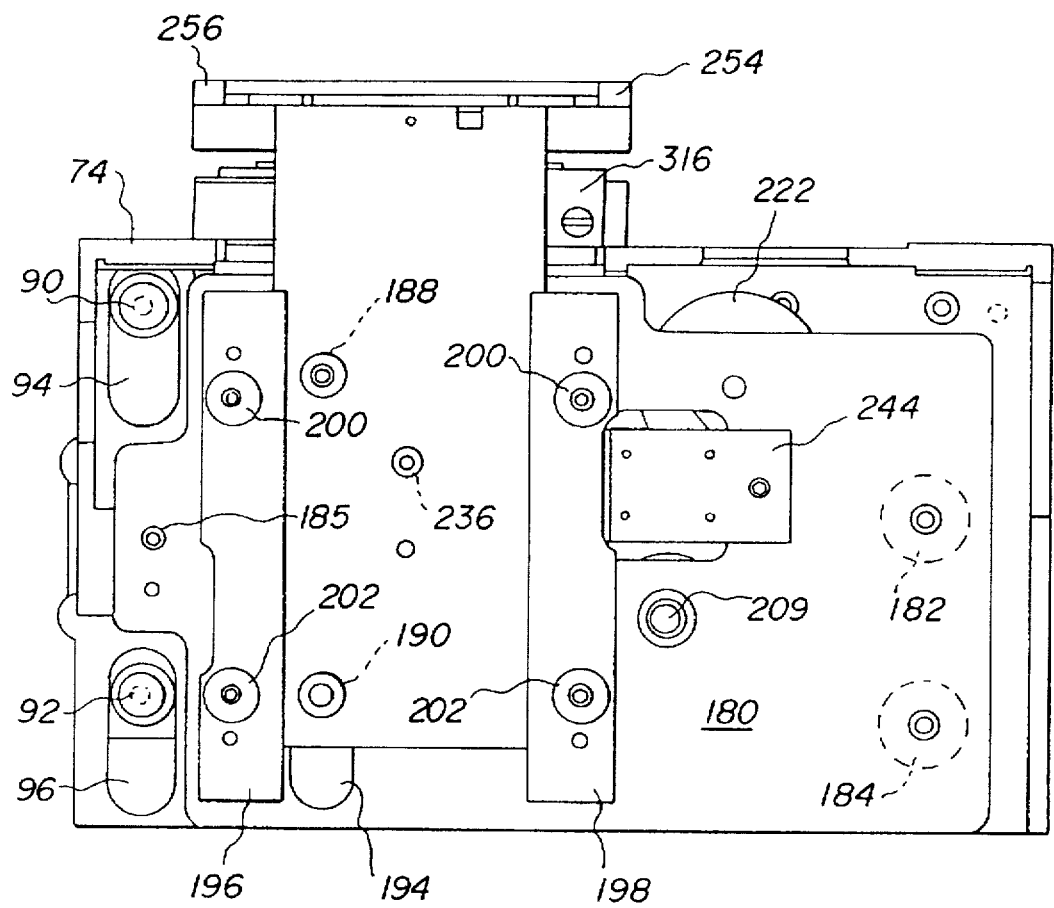
FIG. 10 shows a back elevation view as seen from the right of FIG. 4.
Figure 11:
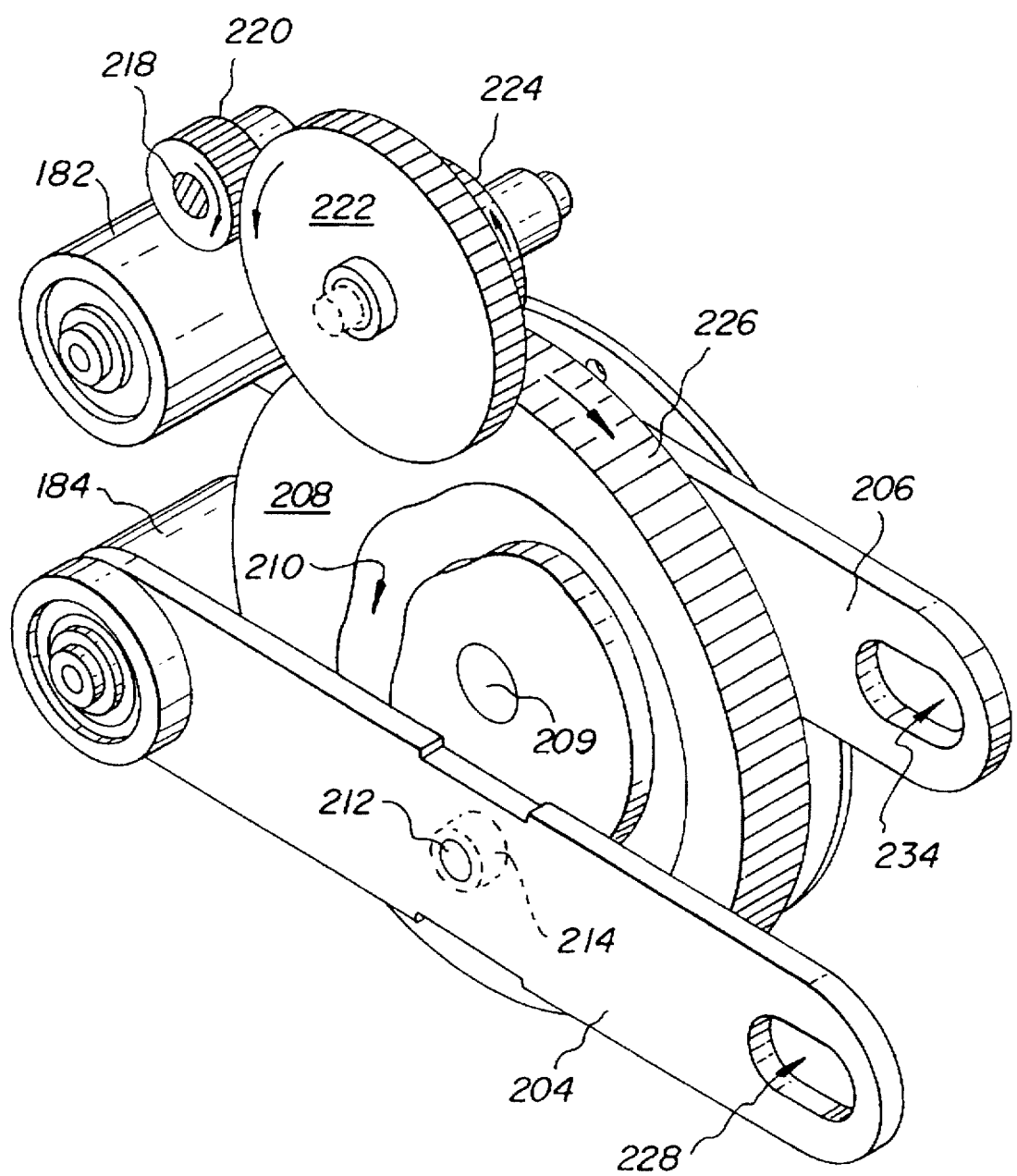
FIG. 11 shows a front perspective view of major components of the vertical positioning mechanism for the edge guides and deflection rollers.
Figure 12:
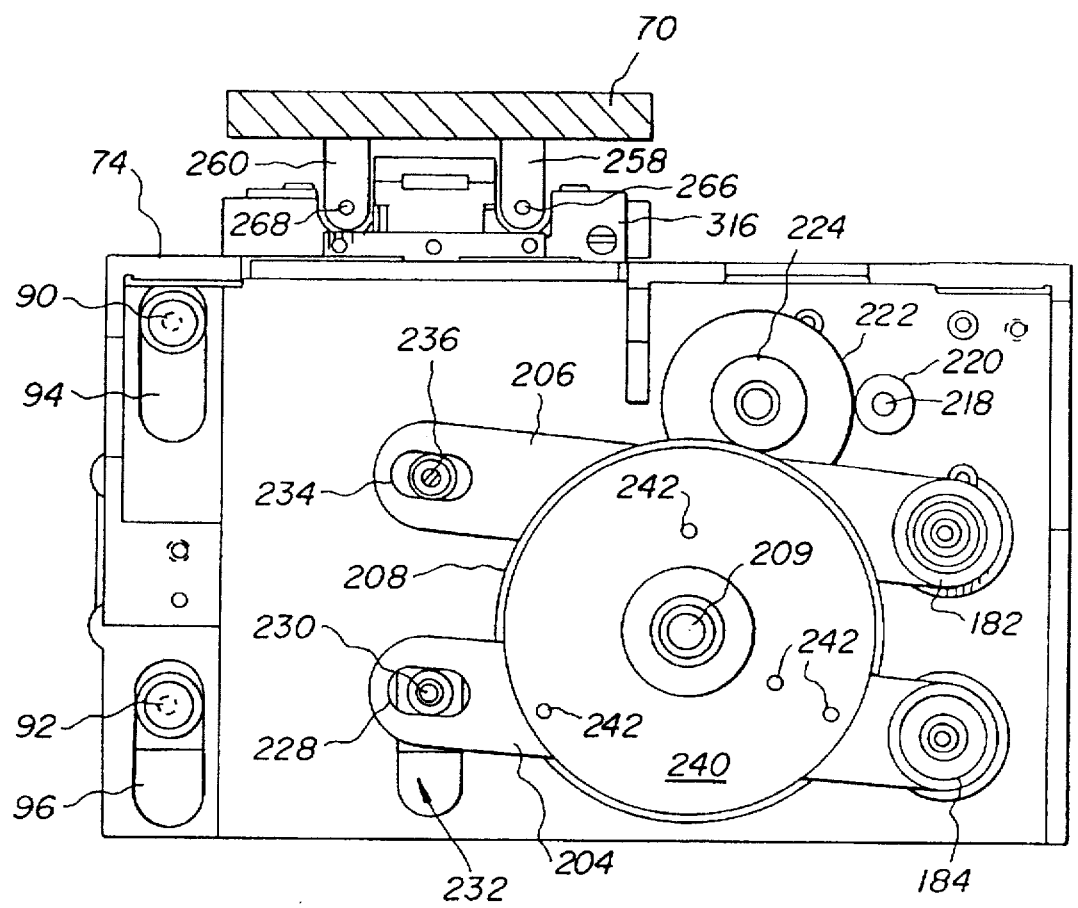
FIG. 12 shows a sectional view along line 12—12 of FIG. 5.
Figure 13:
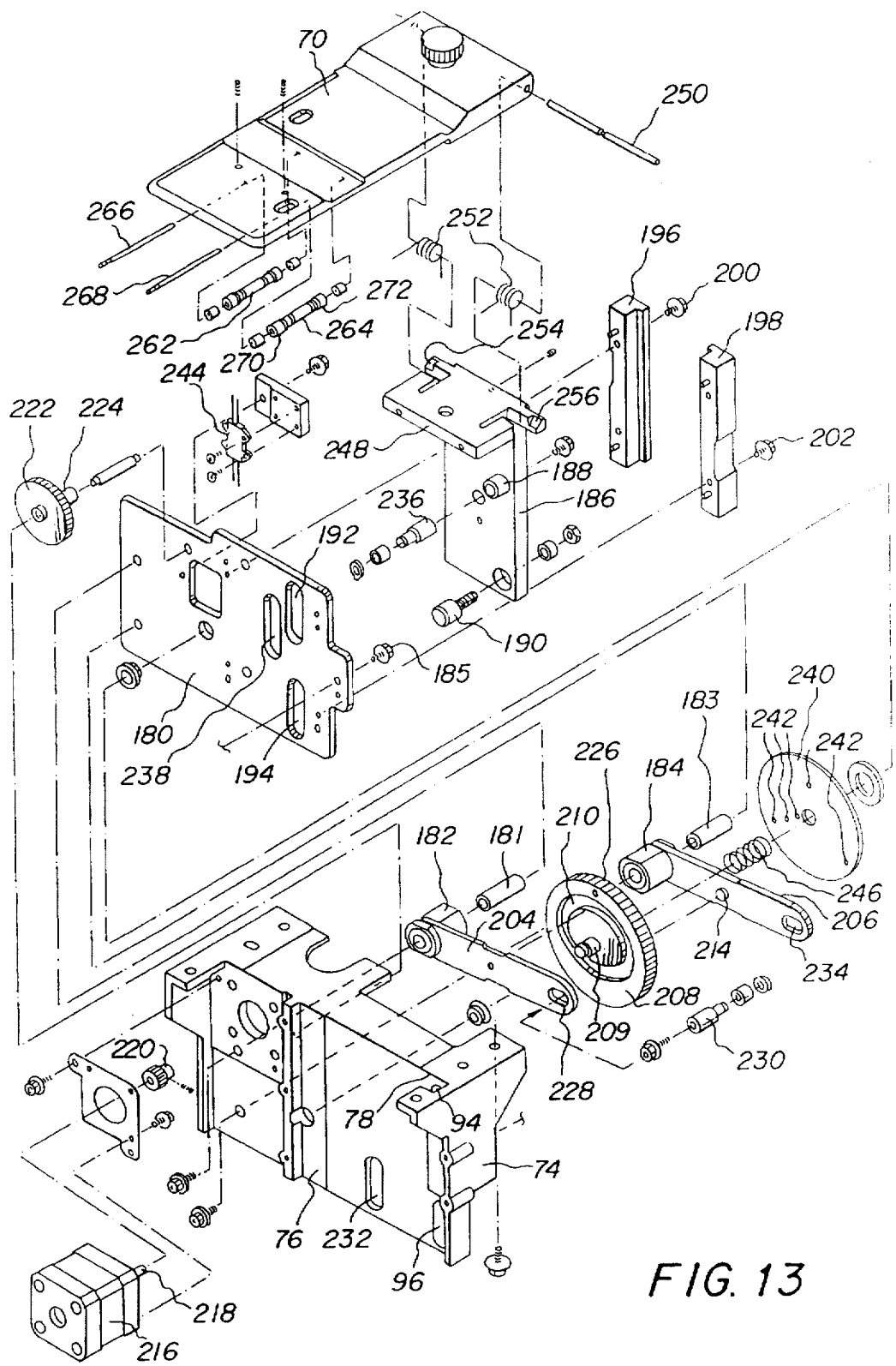
FIG. 13 shows an exploded view of the vertical positioning mechanism for the edge guides and deflection rollers.

Turning now to FIGS. 10 to 13, additional features of the apparatus of the invention can be understood. A slide support plate 180, seen in FIGS. 10 and 13, is mounted in spaced relationship to the back of frame 74 by means of a pair of shafts 181, 183 which support a pair of pivot blocks 182, 184; and by a fastener 185. On the back surface of support plate 180, a vertical slide 186 is mounted in position to pivotably mount support plate 70. A pair of guide rollers 188, 190 are mounted to the front of slide 186 in position to engage slots 192, 194 through support plate 180. A pair of guide tracks 196, 198 secure the slide for vertical movement and are attached to support plate 180 by fasteners 200, 202. Thus, slide 186 is free to move vertically between limits set by slots 192, 194.

Between support plate 180 and the back of frame 74 is mounted a mechanism for vertically moving carriage frame 84 and slide 186. As seen best in FIGS. 10 to 13, this mechanism comprises a pair of cam follower or elevator levers 204, 206 mounted to pivot blocks 182, 184. Between the elevator levers, a dual cam plate 208 is mounted for rotation on an axle 209 cantilevered from frame 74. Cam plate 208 includes in each of its opposite faces a cam slot 210, the slots on the opposite sides being about 180° out of phase. Approximately midway along each elevator lever, an axle 212 supports a cam follower 214, shown in phantom in FIG. 11, which engages one of slots 210. To rotate cam plate 208, a motor 216 is mounted to the front side of frame 74, the motor having an output shaft 218 which extends through a bore in the frame. A driver pinion gear 220 is mounted on shaft 218 and engages a larger gear 222 fixedly mounted on a common shaft with a smaller gear 224 which engages a gear 226 on the periphery of the cam plate. Thus, when motor 216 is energized, the cam plate will rotate and cause the elevator links to pivot in opposite directions.

As best seen in FIG. 13, a slot 228 at the free end of elevator link 204 is engaged with a rotary connector 230 which extends through a slot 232 in frame 74 and connects to carriage frame 84. Similarly, a slot 234 in elevator link 206 is engaged with a rotary connector 236, shown in the upper part of FIG. 13, which extends through a slot 238 in support plate 180 and connects to slide 186. Thus, movement of elevator links 204, 206 in the manner previously described will cause carriage frame 84 and an assembly of slide 186 and support plate 70 to move toward or away from each other. Movement of the carriage frame and slide is monitored by means of a disk 240 resiliently mounted on shaft 209. A plurality of magnetic inserts 242 on the disk influence a magnetic sensor 244 mounted to support plate 180. Sensor 244 then provides a signal to the controller for the apparatus, to indicate the relative vertical positions of the carriage frame and slide, for a purpose to be described subsequently. A spring 246 separates disk 240 from the cam plate.

At the top of slide 186 is provided a horizontally extended mounting bracket 248. An axle 250 and a pair of springs 252 resiliently pivot film deflector support plate 70 to bracket 248. A captured screw, not illustrated but operable by an external knob 253, may be used to hold support plate 70 against bracket 248 in the horizontal position shown in FIGS. 2 and 3. When the screw is turned out of engagement with bracket 248, support plate 70 can pivot upward to provide access to the interior of the apparatus for cleaning or adjustments, its motion being limited by a pair of stops 254, 256. As seen best in FIGS. 12 and 13, support plate 70 includes on its under side two pairs of downwardly extended bosses 258, 260 which rotatably support a pair of film deflector rollers 262, 264 on axles 266, 268. Each roller includes a pair of raised edges 270, 272 for contacting the opposite edges of the film, outside frames 20 to prevent damage to the photographic images.

In operation of the apparatus described thus far with reference to FIGS. 10 to 13, motor 216 is energized to move carriage frame 84 upward and support plate 70 downward. Deflector rollers 262, 274 engage the film. The edge guides then are moved into position in the manner previously described. As a result of these movements, the film is deflected into a serpentine path along surface 160 to provide lateral column strength in the manner previously described and to constrain the film against central curved portion 162. The depth of movement of rollers 262, 264 into valley portions 168, 170 will determine the final serpentine path of the film. For thicker films, the depth of engagement will be less than that required for thinner films, to provide the desired lateral column strength. For stiffer films, the depth of engagement will decrease. For a film of given thickness and stiffness, an increase in transverse width of the film will require a deeper engagement. Sensor 244 is used to signal the controller of the apparatus when carriage frame 84 and support plate 70 have reached the proper position for a given film format.

FIGS. 9 and 14 show features of a pair of optical code reader heads 274, 276 used to read optical codes on the film as it moves over curved central portion 162. Reader heads are provided for both edges of the film in the illustrated embodiment; however, a single reader head one only one carriage member may be used when the optical codes will appear on only one edge of the film. Each of carrier members 138, 140 includes a pair of parallel guide tracks 278, 280 which act as a frame to support transverse slider flanges 282 of a housing or body 284 of the reader head. Only one of flanges 282 is visible in FIG. 9. As seen in FIG. 14, body 284 includes a horizontal slot 286 through which an edge portion of a film strip passes during use of the apparatus. A vertical bore in body 284 receives a light emitting diode 290 whose beam is projected upwardly through a plano-convex lens 292 and through vertically extended opening 293 provided in central portion 162 of each edge guide. On the opposite side of slot 286, a code reader chip 294, of the type described in U.S. Pat. No. 5,317,139, is mounted on a carrier 296 behind a glass window 298. Preferably, window 298 is coated with a conventional infrared filter material to filter out the infrared range and reduce noise in the output of the reader chip. A cover plate 300 protects the chip from damage. As seen in FIGS. 4 and 9, a pair of keeper plates 312 hold each reader head in position on guide tracks 278, 280. As a film strip moves through the apparatus, light from diode 290 is projected through the transparent edge of the processed film, thus enabling reader chip 294 to detect and interpret the bar codes and provide the resultant information to the controller of the apparatus.

A mechanism is provided to precisely position each reader head relative to wall segment 152 of its associated edge guide. A shaft 302 is rotatably captured within block 284. A threaded end 304 of shaft 302 is in threaded engagement with a frame member 306 attached to carriage member 140. Within the block, a fourteen tooth pinion gear 308 fixed on shaft 302 is engaged by a rotatable worm gear 310. Thus, by rotating the worm gear from outside block 284, pinion 308 will rotate shaft 302 and cause threaded end 304 to rotate into or out of frame member 306. Block 284 thus can be traversed back and forth on guide tracks 278, 280 to position reader chip 294 relative to a fixed reference provided by the vertical surface of wall segment 152. For example, if threaded end 304 has an 8–36 thread and worm gear 310 is a ¼-20 set screw, then one full rotation of the worm gear will cause 0.002 inch (0.051 mm) movement of the reader head along the guide tracks. Thus, even though the edge guides are movable in the manner previously described, each reader head can be accurately adjusted to ensure its alignment with wall segment 152, thus greatly simplifying the set up of the apparatus.

Referring to FIGS. 4, 5, 8, 9 and 15, the edge notch detector according to the invention can be understood. By "edge notch" is meant a cut out portion or opening near or at the edge of the film, such as notch 24 which opens through the edge of the film or perforation 22 which opens inside the edge. The detector of the invention can be positioned to detect either type. Formed integrally with each carriage member 138, 140 are support blocks 314, 316 for a notch or opening detector. Each support block includes a worm gear 318 coupled to a pinion, not illustrated, and a threaded shaft 320, to provide an adjustment mechanism of the type described in the preceding paragraph. A pair of apertures 319 in support plate 70 permit rotation of worm gears 318 without raising the support plate. Shaft 320 is in threaded engagement with an upwardly extended tab 322 on a sensor support block 324. A guide pin or track 325, visible in FIG. 15, is captured in support block 324 and extends into a bore, not illustrated, in the associated support block 314, to constrain block 324 to horizontal movement. A slot or guide track 327 on an under side of edge guide 156 or 158, visible in FIG. 8, further constrains movement of block 324. A downwardly extended, L-shaped hanger bracket 326 is mounted to one side of block 324 to support an incandescent, coaxial optical fiber sensor 328 having an upwardly extended optical fiber probe 330. An essentially vertical bore through block 324 receives probe 330 which extends into a slot 334 formed in contact surface 160 at the top of curved portion 172, as best seen in FIG. 8. Because detectors are provided for both edge guides 156, 158, the apparatus can detect notches on both sides of the web. An electrical connector 336 provides notch detection signals to a controller 338 which may be mounted to an under side of deck plate 62, as indicated schematically in FIG. 3.

In operation of the notch or opening detector, a moving web of photographic film moves past slot 334. Unless a perforation 22 or notch 24 is present above slot 334, reflection occurs from an underside of the film, causing sensor 328 to produce a signal indicating no notch present. But, when a notch or opening appears above slot 334, no reflection or greatly reduced reflection causes the sensor to signal presence of a notch or opening. The output of sensor 328 is directed to controller 338, which signals a downstream photographic printer when a notch is present, thus indicating that a downstream frame of the film is in position for scanning and projection onto photographic paper in the familiar manner.

Controller 338 is shown only schematically since those skilled in the art are familiar with the structure and function of such devices. In a most general sense, the controller energizes motor 216 to cause carriage 84 to move upward and slide 186 to move downward to engage rollers 262, 264 with the film. Eventually, the controller receives a signal from sensor 244 to indicate that the desired depth of engagement has been reached for the particular film. The controller then energizes motor 108 to cause edge guides 156, 158 to move toward each other to engage a film strip and, eventually, receives a signal from sensor 179 to indicate that the desired spacing has been reached. The controller then causes motor 108 to rotate an additional amount to cause the resilient loading previously described. A signal indicating the width and physical properties of the film being transported through the apparatus is provided from one of readers 274, 276, depending on which edge of the film bears the bar codes. As previously indicated, the width and physical properties of the film will indicate the desired spacing of the edge guides and the depth of engagement of the serpentine path. When a different type of film is to be run, the controller energizes the motors to separate the edge guides and disengage the rollers until the new film has been inserted.

Parts List

10 . . . film flattening apparatus
12 . . . photographic film strip
14 . . . thin web
16, 18 . . . edges of 12
20 . . . frames
22 . . . perforations
24 . . . spaced notches
26 . . . base
28 . . . flat surface
30, 32 . . . cylindrical portion
34, 36 . . . curved contact surface of 30, 32
38, 40 . . . film deflector member
42, 44 . . . curved contact surface of 38, 40
46, 48 . . . reliefs in 42, 44
50, 52 . . . cylindrical elements
60 . . . film code
62 . . . support or deck plate
64, 66 . . . apertures for fasteners
68 . . . shallow image relief slot
68a . . . image relief slot on 70
70 . . . film deflector support plate
74 . . . frame
76, 78 . . . vertical slide surfaces on 74
80, 82 . . . flanges on 84
84 . . . cantilevered carriage frame
86, 88 . . . keeper plates
90, 92 . . . guide rollers on 80, 82
94, 96 . . . slots in 74
98 . . . back wall of 74
110, 102 . . . cantilever arms
104 . . . front wall
106 . . . motor
108 . . . output shaft
110 . . . driver gear
112, 114 . . . bearings
116 . . . lead screw
118, 120 . . . traveling nuts
122, 124 . . . springs
126, 128 . . . sliding collars
130 . . . driven gear engages 110
132, 134 . . . parallel guide tracks
136 . . . open slot between 132, 134
138, 140 . . . carriage members
142 . . . holder or pocket in 138, 140
144, 146 . . . lateral tinges to engage 132, 134
145, 147 . . . keepers
148 . . . vertical edge guide member
150, 152, 154 . . . wall segments
156, 158 . . . horizontal edge guide members
160 . . . undulating, horizontal contact surface
162 . . . central curved portion
164, 166 . . . further, downwardly curved portions
168, 170 . . . valley portions
172, 174 . . . upwardly curved portions
176 . . . sloping wall of 156, 158
178 . . . fasteners 179 . . . sensor
179m . . . magnet on 145, 147
180 . . . slide support plate
181, 183 . . . shaft
182, 184 . . . pivot blocks
185 . . . fasteners
186 . . . vertical slide for 70
188, 190 . . . guide rollers
192, 194 . . . slots in 180
196, 198 . . . guide tracks
200, 202 . . . fasteners for 196, 198
204, 206 . . . elevator levers
208 . . . dual cam plate
209 . . . axle
210 . . . cam slot
212 . . . axle for 214
214 . . . cam follower
216 . . . motor
218 . . . output shaft
220 . . . gear
222 . . . gear
224 . . . gear
226 . . . gear on 208
228 . . . slot in 204
230 . . . rotary connector
232 . . . slot in 74
234 . . . slot in 206
236 . . . rotary connector
238 . . . slot in 180
240 . . . disk
242 . . . magnetic inserts
244 . . . sensors
246 . . . spring
248 . . . mounting bracket on 186
250 . . . axle
252 . . . springs
253 . . . external knob
254, 256 . . . stops
258, 260 . . . downward bosses on 70
262, 264 . . . rollers
266, 268 . . . axles
270, 272 . . . raised edges of 262, 264
274, 276 . . . optical code reader heads
278, 280 . . . guide tracks on 138, 140
282 . . . transverse slider flanges on 284
284 . . . housing or body of 274, 276
286 . . . slot for edge of 12
288 . . . bore
290 . . . light emitting diode
292 . . . plano-convex lens
293 . . . opening in 162
294 . . . reader chip
296 . . . carrier
298 . . . window
300 . . . cover
302 . . . shaft
304 . . . threaded end of 304
306 . . . frame member attached to 140
308 . . . pinion
310 . . . worm gear
312 . . . keepers
314, 316 . . . support block for notch or opening detector
318 . . . worm gear
319 . . . apertures in 70
320 . . . shaft
322 . . . tab
324 . . . sensor support block
325 . . . guide pin or track
326 . . . L-shaped hanger bracket
327 . . . slot or guide track on under side of 156, 158
328 . . . incandescent coaxial optical fiber sensor
330 . . . optical fiber probe
332 . . . bore through 324
334 . . . slot in 160 at 172
336 . . . electrical connector
338 . . . controller While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for reading optical code on moving web of photographic film, comprising:

a first frame;

a substantially straight track supported by said first frame;

first and second carriage members mounted for movement along said track;

first and second oppositely facing edge guides each supported by a respective one of said carriage members, each edge guide being positioned transversely to said track and each edge guide comprising a contact surface for engaging an edge of the web moving between said edge guides, each contact surface comprising a central portion and, on opposite sides of said central potion, further, curved potions to provide lateral strength in the film moving across said contact surfaces between said edge guides;

means for moving said first and second carriage members back and forth along said track to vary a distance between said edge guides to accommodate webs of different widths;

a first flexure resiliently engaging said means for moving with said first carriage member when said guides are moved toward each other;

a second flexure resiliently engaging said means for moving with said second carriage member when said guides are moved toward each other;

a second frame;

first and second film deflectors supported by said second frame;

means for relatively positioning said first and second frames with said film deflectors engaging the film on opposite sides of said central portion, thereby to deflect the film into a serpentine path extended along one of said further curved portions, across said central portion and along the other of said further curved portions, said means for relatively positioning being selectively adjustable to vary deflection of the film into said serpentine path, whereby films having different properties can be constrained;

a housing having a slot through which an edge of the web may be transported, said housing being supported respectively by one of said first and second carriage members;

a light source mounted in said housing on one side of said slot;

a code reader mounted in said housing on an opposite side of said slot;

means for moving said housing relative to its said one carriage member to adjust location of said reader relative to an edge of the web.

2. Apparatus according to claim 1, wherein said means for moving said carriage members comprises:

a first lead screw rotatably supported by said first frame;

a second, oppositely threaded lead screw rotatably supported by said first frame;

a first traveling nut on said first lead screw;

a second traveling nut on said second lead screw;

said fast flexure resiliently engaging said first nut with said first carriage member when said guides are moved toward each other;

said second flexure resiliently engaging said second nut with said second carriage member when said guides are moved toward each other; and means for rotating said lead screws.

3. Apparatus according to claim 1, further comprising:

means for detecting movement of said edge guides to positions corresponding to a preselected width of the web and producing a signal; and control means responsive to said signal for causing said means for moving said carriage members to move said guides beyond said positions to compress said first and second flexures to load said edge guides resiliently against the edges of the web.

4. Apparatus according to claim 1, wherein each edge guide comprises a transverse contact surface for engaging a strip of film and an angled surface for guiding a strip to said contact surface during movement of said edge guides toward one another.

5. Apparatus according to claim 1, wherein said means for relatively positioning comprises:

a third a first, substantially straight guide supported by said third frame, said first frame being mounted for movement on said first guide;

a second, substantially straight guide supported by said third frame, said second frame being mounted for movement on said second guide;

a cam rotatably supported by said third frame;

first and second elevator levers pivotably supported by said third frame and engaged with said cam, said elevator levers being pivotably connected respectively with said first and second frames; and means for rotating said cam to pivot said elevator levers and thereby to move said first and second frames along said first and second guides.

6. Apparatus according to claim 5, wherein said cam is a plate having cam slots on opposite sides, said first and second elevator levers being engaged with opposite cam slots.

7. Apparatus according to claim 6, wherein said plate is a gear driven by said means for rotating said cam.

8. Apparatus according to claim 5, further comprising a plurality of sensors for detecting rotation of said cam to positions corresponding to webs with different properties.

9. Apparatus according to claim 1, wherein said first and second film deflectors each comprise a roller having raised edges for engaging the film.

10. Apparatus according to claim 1, wherein said means for moving said housing comprises:

a shaft mounted for rotation in said housing, said shaft having an end in threaded engagement with said carriage member;

a pinion fixedly mounted on said shaft; and a worm gear mounted for rotation in said housing and engaged with said pinion, whereby rotation of said worm gear causes said pinion to rotate said shaft and said end to move said housing relative to said carriage member.

11. Apparatus according to claim 1, wherein said light source comprises a light emitting diode and a plano-convex lens.

12. Apparatus according to claim 1, wherein said code reader comprises a glass window coated with an infrared filter material.

13. Apparatus according to claim 1, wherein said central portion is curved.

14. Apparatus according to claim 1, wherein said central portion is essentially flat.

* * * * *

UNITED STATES PATENT AND TRADEMARK OFFICE
CERTIFICATE OF CORRECTION

PATENT NO. : 5,644,120
DATED : July 1, 1997
INVENTOR(S) : Carl W. Roy, et al

It is certified that error appears in the above-indentified patent and that said Letters Patent is hereby corrected as shown below:

title page, [57] ABSTRACT, line 3, delete "fast" and insert --first-- col. 12, claim 1, line 30, "potions" should read --portions-- col. 13, claim 2, line 8, "fast" should read --first-- col. 13, claim 5, line 33, after "third" insert --frame--

Signed and Sealed this

Sixteenth Day of September, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,644,120
DATED : July 1, 1997
INVENTOR(S) : Roy King et al.

It is certified that an error appears in the above-identified patent and that said Letters Patent is hereby corrected as shown below:

Title page, insert --Related U.S. Application Data [60] Provisional application No. 60/005,610, Oct. 19, 1995--

Signed and Sealed this

Twenty-fifth Day of November, 1997

Attest:

BRUCE LEHMAN

Attesting Officer

Commissioner of Patents and Trademarks